(12) United States Patent
Richardson et al.

(10) Patent No.: US 8,397,073 B1
(45) Date of Patent: Mar. 12, 2013

(54) MANAGING SECURE CONTENT IN A CONTENT DELIVERY NETWORK

(75) Inventors: David R. Richardson, Seattle, WA (US); Mustafa I. Abrar, Seattle, WA (US); Don Johnson, Seattle, WA (US); John Cormie, Seattle, WA (US); Bradley E. Marshall, Bainbridge Island, WA (US); Mark Joseph Cavage, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 345 days.

(21) Appl. No.: 12/722,454

(22) Filed: Mar. 11, 2010

Related U.S. Application Data

(60) Provisional application No. 61/240,164, filed on Sep. 4, 2009.

(51) Int. Cl.
*H04L 29/06* (2006.01)
(52) U.S. Cl. .................... 713/176; 713/150; 713/168
(58) Field of Classification Search .................. 713/176, 713/150, 168
See application file for complete search history.

(56) References Cited

U.S. PATENT DOCUMENTS

| | | | |
|---|---|---|---|
| 5,341,477 A | 8/1994 | Pitkin et al. | |
| 5,611,049 A | 3/1997 | Pitts | |
| 5,774,660 A | 6/1998 | Brendel et al. | |
| 5,892,914 A | 4/1999 | Pitts | |
| 6,016,512 A | 1/2000 | Huitema | |
| 6,026,452 A | 2/2000 | Pitts | |
| 6,052,718 A | 4/2000 | Gifford | |
| 6,085,234 A | 7/2000 | Pitts et al. | |
| 6,098,096 A | 8/2000 | Tsirigotis et al. | |
| 6,108,703 A | 8/2000 | Leighton et al. | |
| 6,182,111 B1 | 1/2001 | Inohara et al. | |
| 6,185,598 B1 | 2/2001 | Farber et al. | |
| 6,192,051 B1 | 2/2001 | Lipman et al. | |
| 6,205,475 B1 | 3/2001 | Pitts | |

(Continued)

FOREIGN PATENT DOCUMENTS

| | | |
|---|---|---|
| CN | 1422468 A | 6/2003 |
| WO | WO 2007/007960 A1 | 1/2007 |

(Continued)

OTHER PUBLICATIONS

American Bar Association; Digital Signature Guidelines Tutorial [online]; Feb. 10, 2002 [retrived on Mar. 2, 2010]; American Bar Association Section of Science and Technology Information Security Committee; Retrived from the internet: <URL:http://web.archive.org/web/20020210124615/www.abanet.org/scitech/ec/isc/dsg-tutorial.html; pp. 1-8.*

(Continued)

*Primary Examiner* — Edan Orgad
*Assistant Examiner* — Bradley Holder
(74) *Attorney, Agent, or Firm* — Knobbe, Martens, Olson & Bear, LLP

(57) ABSTRACT

A system, method, and computer readable medium for managing secure content by CDN service providers are provided. A network storage provider stores one or more resources on behalf of a content provider. A CDN service provider obtains client computing device requests for secure content. Based on processing first signature information, the CDN service provider determines whether the secure content is available to the client computing device. If the CDN service provider does not maintain the requested content, the CDN service provider transmits a request to the network storage provider. Based on second signature information and an identifier associated with the CDN service provider, the network storage provider processes the request based policy information associated with the identifier.

18 Claims, 7 Drawing Sheets

U.S. PATENT DOCUMENTS

| | | |
|---|---|---|
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,415,280 B1 | 7/2002 | Farber et al. |
| 6,457,047 B1 | 9/2002 | Chandra et al. |
| 6,484,143 B1 | 11/2002 | Swildens et al. |
| 6,505,241 B2 | 1/2003 | Pitts |
| 6,553,413 B1 | 4/2003 | Leighton et al. |
| 6,560,610 B1 | 5/2003 | Eatherton et al. |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,785,704 B1 | 8/2004 | McCanne |
| 6,804,706 B2 | 10/2004 | Pitts |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,082,476 B1 | 7/2006 | Cohen et al. |
| 7,086,061 B1 | 8/2006 | Joshi et al. |
| 7,092,505 B1 | 8/2006 | Allison et al. |
| 7,092,997 B1 | 8/2006 | Kasriel et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,200,667 B2 | 4/2007 | Teodosiu et al. |
| 7,225,254 B1 | 5/2007 | Swildens et al. |
| 7,228,350 B2 | 6/2007 | Hong et al. |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,260,598 B1 | 8/2007 | Liskov et al. |
| 7,269,784 B1 | 9/2007 | Kasriel et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,363,291 B1 | 4/2008 | Page |
| 7,441,045 B2 | 10/2008 | Skene et al. |
| 7,461,170 B1 | 12/2008 | Taylor et al. |
| 7,464,142 B2 | 12/2008 | Flurry et al. |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,624,169 B2 | 11/2009 | Lisiecki et al. |
| 7,650,376 B1 | 1/2010 | Blumenau |
| 7,653,700 B1 | 1/2010 | Bahl et al. |
| 7,680,897 B1 | 3/2010 | Carter et al. |
| 7,706,740 B2 | 4/2010 | Collins et al. |
| 7,707,314 B2 | 4/2010 | McCarthy et al. |
| 7,716,367 B1 | 5/2010 | Leighton et al. |
| 7,725,602 B2 | 5/2010 | Liu et al. |
| 7,739,400 B2 | 6/2010 | Lindbo et al. |
| 7,747,720 B2 | 6/2010 | Toebes et al. |
| 7,761,572 B1 | 7/2010 | Auerbach |
| 7,769,823 B2 | 8/2010 | Jenny et al. |
| 7,773,596 B1 | 8/2010 | Marques |
| 7,774,342 B1 | 8/2010 | Virdy |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,962,597 B2 | 6/2011 | Richardson et al. |
| 7,966,404 B2 | 6/2011 | Hedin et al. |
| 7,991,910 B2 | 8/2011 | Richardson et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,065,275 B2 | 11/2011 | Eriksen et al. |
| 8,073,940 B1 | 12/2011 | Richardson et al. |
| 8,082,348 B1 | 12/2011 | Averbuj et al. |
| 8,117,306 B1 | 2/2012 | Baumback et al. |
| 8,122,098 B1 | 2/2012 | Richardson et al. |
| 2001/0032133 A1 | 10/2001 | Moran |
| 2001/0049741 A1 | 12/2001 | Skene et al. |
| 2001/0056416 A1 | 12/2001 | Garcia-Luna-Aceves |
| 2002/0007413 A1 | 1/2002 | Garcia-Luna-Aceves et al. |
| 2002/0048269 A1 | 4/2002 | Hong et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1* | 6/2002 | Russell et al. ............... 725/92 |
| 2002/0083118 A1* | 6/2002 | Sim ............................. 709/105 |
| 2002/0083148 A1 | 6/2002 | Shaw et al. |
| 2002/0092026 A1 | 7/2002 | Janniello et al. |
| 2002/0099616 A1 | 7/2002 | Sweldens |
| 2002/0099850 A1* | 7/2002 | Farber et al. ............... 709/245 |
| 2002/0101836 A1 | 8/2002 | Dorenbosch |
| 2002/0116481 A1* | 8/2002 | Lee ............................. 709/220 |
| 2002/0124098 A1* | 9/2002 | Shaw .......................... 709/231 |
| 2002/0138286 A1 | 9/2002 | Engstrom |
| 2002/0138437 A1* | 9/2002 | Lewin et al. ................. 705/51 |
| 2002/0147770 A1 | 10/2002 | Tang |
| 2002/0156911 A1 | 10/2002 | Croman et al. |
| 2002/0163882 A1* | 11/2002 | Bornstein et al. ........... 370/227 |
| 2002/0188722 A1 | 12/2002 | Banerjee et al. |
| 2003/0002484 A1* | 1/2003 | Freedman .................... 370/352 |
| 2003/0009591 A1 | 1/2003 | Hayball et al. |
| 2003/0065739 A1 | 4/2003 | Shnier |
| 2003/0099202 A1 | 5/2003 | Lear et al. |
| 2003/0101278 A1 | 5/2003 | Garcia-Luna-Aceves et al. |
| 2003/0135509 A1 | 7/2003 | Davis et al. |
| 2003/0140087 A1 | 7/2003 | Lincoln et al. |
| 2003/0145066 A1* | 7/2003 | Okada et al. ............... 709/219 |
| 2003/0149581 A1 | 8/2003 | Chaudhri et al. |
| 2003/0154239 A1* | 8/2003 | Davis et al. ................. 709/201 |
| 2003/0163722 A1 | 8/2003 | Anderson, IV |
| 2003/0172183 A1 | 9/2003 | Anderson, IV et al. |
| 2003/0174648 A1* | 9/2003 | Wang et al. ................. 370/235 |
| 2003/0182413 A1 | 9/2003 | Allen et al. |
| 2003/0187935 A1 | 10/2003 | Agarwalla et al. |
| 2003/0191822 A1 | 10/2003 | Leighton et al. |
| 2003/0204602 A1* | 10/2003 | Hudson et al. ............... 709/228 |

| | | | |
|---|---|---|---|
| 2003/0229682 A1* | 12/2003 | Day .................................. 709/219 |
| 2003/0233423 A1* | 12/2003 | Dilley et al. ..................... 709/214 |
| 2004/0010621 A1* | 1/2004 | Afergan et al. ................. 709/247 |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044791 A1 | 3/2004 | Pouzzner |
| 2004/0064501 A1 | 4/2004 | Jan et al. |
| 2004/0073596 A1* | 4/2004 | Kloninger et al. .............. 709/200 |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1* | 8/2004 | Douglas et al. ................ 709/225 |
| 2004/0172466 A1 | 9/2004 | Douglas et al. |
| 2004/0194085 A1 | 9/2004 | Beaubien et al. |
| 2004/0203630 A1 | 10/2004 | Wang |
| 2004/0205149 A1 | 10/2004 | Dillon et al. |
| 2004/0205162 A1* | 10/2004 | Parikh ............................ 709/219 |
| 2004/0215823 A1 | 10/2004 | Kleinfelter et al. |
| 2004/0249971 A1 | 12/2004 | Klinker |
| 2004/0249975 A1 | 12/2004 | Tuck et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1* | 1/2005 | Maggi et al. ................... 709/223 |
| 2005/0038967 A1 | 2/2005 | Umbehocker et al. |
| 2005/0108529 A1* | 5/2005 | Juneau ........................... 713/168 |
| 2005/0114296 A1* | 5/2005 | Farber et al. ....................... 707/1 |
| 2005/0132083 A1 | 6/2005 | Raciborski et al. |
| 2005/0157712 A1 | 7/2005 | Rangarajan et al. |
| 2005/0171959 A1 | 8/2005 | Deforche et al. |
| 2005/0188073 A1 | 8/2005 | Nakamichi et al. |
| 2005/0216569 A1* | 9/2005 | Coppola et al. ................ 709/213 |
| 2005/0216674 A1 | 9/2005 | Robbin et al. |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2006/0013158 A1 | 1/2006 | Ahuja et al. |
| 2006/0020596 A1 | 1/2006 | Liu et al. |
| 2006/0020684 A1* | 1/2006 | Mukherjee et al. ........... 709/219 |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0037037 A1 | 2/2006 | Miranz |
| 2006/0047787 A1 | 3/2006 | Agarwal et al. |
| 2006/0063534 A1 | 3/2006 | Kokkonen et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0112176 A1 | 5/2006 | Liu et al. |
| 2006/0120385 A1* | 6/2006 | Atchison et al. .............. 370/400 |
| 2006/0143293 A1* | 6/2006 | Freedman ...................... 709/225 |
| 2006/0155823 A1 | 7/2006 | Tran et al. |
| 2006/0161541 A1 | 7/2006 | Cencini |
| 2006/0168088 A1* | 7/2006 | Leighton et al. ............... 709/207 |
| 2006/0193247 A1 | 8/2006 | Naseh et al. |
| 2006/0195866 A1 | 8/2006 | Thukral |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259984 A1* | 11/2006 | Juneau ............................ 726/28 |
| 2006/0265508 A1 | 11/2006 | Angel et al. |
| 2006/0265516 A1 | 11/2006 | Schilling |
| 2006/0271641 A1 | 11/2006 | Stavrakos et al. |
| 2006/0282522 A1* | 12/2006 | Lewin et al. ................... 709/223 |
| 2007/0005689 A1 | 1/2007 | Leighton et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0038994 A1* | 2/2007 | Davis et al. .................... 717/174 |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0055764 A1* | 3/2007 | Dilley et al. ................... 709/223 |
| 2007/0076872 A1* | 4/2007 | Juneau ............................ 380/202 |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0168517 A1* | 7/2007 | Weller et al. ................... 709/226 |
| 2007/0174426 A1 | 7/2007 | Swildens et al. |
| 2007/0174442 A1* | 7/2007 | Sherman et al. ............... 709/223 |
| 2007/0208737 A1 | 9/2007 | Li et al. |
| 2007/0219795 A1 | 9/2007 | Park et al. |
| 2007/0220010 A1* | 9/2007 | Ertugrul ........................... 707/10 |
| 2007/0244964 A1 | 10/2007 | Challenger et al. |
| 2007/0250467 A1 | 10/2007 | Mesnik et al. |
| 2007/0250560 A1* | 10/2007 | Wein et al. ..................... 709/201 |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0271385 A1* | 11/2007 | Davis et al. .................... 709/228 |
| 2007/0280229 A1 | 12/2007 | Kenney |
| 2007/0288588 A1* | 12/2007 | Wein et al. ..................... 709/214 |
| 2008/0005057 A1 | 1/2008 | Ozzie et al. |
| 2008/0008089 A1* | 1/2008 | Bornstein et al. .............. 370/227 |
| 2008/0025304 A1* | 1/2008 | Venkataswami et al. ..... 370/390 |
| 2008/0046596 A1 | 2/2008 | Afergan et al. |
| 2008/0065724 A1* | 3/2008 | Seed et al. ...................... 709/203 |
| 2008/0065745 A1* | 3/2008 | Leighton et al. ............... 709/219 |
| 2008/0071859 A1* | 3/2008 | Seed et al. ...................... 709/203 |
| 2008/0071987 A1 | 3/2008 | Karn et al. |
| 2008/0082551 A1* | 4/2008 | Farber et al. ..................... 707/10 |
| 2008/0086574 A1 | 4/2008 | Raciborski et al. |
| 2008/0103805 A1 | 5/2008 | Shear et al. |
| 2008/0104268 A1* | 5/2008 | Farber et al. ................... 709/233 |
| 2008/0114829 A1 | 5/2008 | Button et al. |
| 2008/0134043 A1 | 6/2008 | Georgis et al. |
| 2008/0147866 A1* | 6/2008 | Stolorz et al. .................. 709/226 |
| 2008/0147873 A1 | 6/2008 | Matsumoto |
| 2008/0155061 A1* | 6/2008 | Afergan et al. ................ 709/218 |
| 2008/0155614 A1 | 6/2008 | Cooper et al. |
| 2008/0162667 A1 | 7/2008 | Verma et al. |
| 2008/0189437 A1 | 8/2008 | Halley |
| 2008/0201332 A1 | 8/2008 | Souders et al. |
| 2008/0215718 A1* | 9/2008 | Stolorz et al. .................. 709/223 |
| 2008/0215735 A1* | 9/2008 | Farber et al. ................... 709/226 |
| 2008/0215750 A1* | 9/2008 | Farber et al. ................... 709/233 |
| 2008/0222281 A1* | 9/2008 | Dilley et al. ................... 709/223 |
| 2008/0222291 A1* | 9/2008 | Weller et al. ................... 709/226 |
| 2008/0222295 A1 | 9/2008 | Robinson et al. |
| 2008/0228920 A1 | 9/2008 | Souders et al. |
| 2008/0235400 A1 | 9/2008 | Slocombe et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2009/0016236 A1 | 1/2009 | Alcala et al. |
| 2009/0029644 A1* | 1/2009 | Sue et al. ....................... 455/3.02 |
| 2009/0031367 A1* | 1/2009 | Sue .................................. 725/87 |
| 2009/0031368 A1* | 1/2009 | Ling ................................ 725/87 |
| 2009/0031376 A1* | 1/2009 | Riley et al. .................... 725/105 |
| 2009/0049098 A1 | 2/2009 | Pickelsimer et al. |
| 2009/0070533 A1 | 3/2009 | Elazary et al. |
| 2009/0086741 A1 | 4/2009 | Zhang |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |

| | | |
|---|---|---|
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0248786 A1 | 10/2009 | Richardson et al. |
| 2009/0248852 A1 | 10/2009 | Fuhrmann et al. |
| 2009/0248893 A1 | 10/2009 | Richardson et al. |
| 2009/0259971 A1 | 10/2009 | Rankine et al. |
| 2009/0271577 A1 | 10/2009 | Campana et al. |
| 2009/0271730 A1 | 10/2009 | Rose et al. |
| 2009/0287750 A1 | 11/2009 | Banavar et al. |
| 2009/0307307 A1 | 12/2009 | Igarashi |
| 2009/0327517 A1 * | 12/2009 | Sivasubramanian et al. . 709/238 |
| 2010/0005175 A1 | 1/2010 | Swildens et al. |
| 2010/0011061 A1 | 1/2010 | Hudson et al. |
| 2010/0030662 A1 | 2/2010 | Klein |
| 2010/0088367 A1 | 4/2010 | Brown et al. |
| 2010/0100629 A1 | 4/2010 | Raciborski et al. |
| 2010/0111059 A1 | 5/2010 | Bappu et al. |
| 2010/0121953 A1 | 5/2010 | Friedman et al. |
| 2010/0122069 A1 | 5/2010 | Gonion |
| 2010/0150155 A1 | 6/2010 | Napierala |
| 2010/0192225 A1 | 7/2010 | Ma et al. |
| 2010/0217801 A1 | 8/2010 | Leighton et al. |
| 2010/0226372 A1 | 9/2010 | Watanabe |
| 2010/0257566 A1 | 10/2010 | Matila |
| 2010/0293479 A1 | 11/2010 | Rousso et al. |
| 2010/0299439 A1 | 11/2010 | McCarthy et al. |
| 2010/0332595 A1 | 12/2010 | Fullagar et al. |
| 2011/0078000 A1 | 3/2011 | Ma et al. |
| 2011/0078230 A1 | 3/2011 | Sepulveda |
| 2011/0153941 A1 | 6/2011 | Spatscheck et al. |
| 2011/0238501 A1 | 9/2011 | Almeida |
| 2011/0252142 A1 | 10/2011 | Richardson et al. |
| 2011/0258049 A1 | 10/2011 | Ramer et al. |
| 2011/0276623 A1 | 11/2011 | Girbal |
| 2012/0066360 A1 | 3/2012 | Ghosh |
| 2012/0179839 A1 | 7/2012 | Raciborski et al. |

FOREIGN PATENT DOCUMENTS

WO  WO 2012/044587 A1  4/2012

OTHER PUBLICATIONS

Supplementary European Search Report in Application No. 09727694.3 mailed Jan. 30, 2012 in 6 pages.

International Search Report and Written Opinion in PCT/US2011/053302 mailed Nov. 28, 2011 in 11 pages.

Singapore Written Opinion in Application No. 201006836-9, mailed Oct. 12, 2011 in 12 pages.

Singapore Written Opinion in Application No. 201006837-7, mailed Oct. 12, 2011 in 11 pages.

Singapore Written Opinion in Application No. 201006874-0, mailed Oct. 12, 2011 in 10 pages.

Baglioni et al., "Preprocessing and Mining Web Log Data for Web Personalization", LNAI 2829, 2003, pp. 237-249.

Liu et al., "Combined mining of Web server logs and web contents for classifying user navigation patterns and predicting users' future requests," Data & Knowledge Engineering 61 (2007) pp. 304-330.

Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.

Xu et al., "Decision tree regression for soft classification of remote sensing data", Remote Sensing of Environment 97 (2005) pp. 322-336.

International Search Report and Written Opinion in PCT/US2011/061486 mailed Mar. 30, 2012 in 11 pages.

Singapore Examination Report in Application No. 201006837-7 mailed May 16, 2012.

First Office Action in Chinese Application No. 200980119993.1 dated Jul. 4, 2012.

First Office Action in Chinese Application No. 200980119995.0 dated Jul. 6, 2012.

* cited by examiner

MANAGING SECURE CONTENT IN A CONTENT DELIVERY NETWORK

CROSS-REFERENCE TO RELATED APPLICATION

This application claims the benefit of U.S. Provisional Application No. 61/240,164, entitled DELIVERY OF SECURE CONTENT, and filed on Sep. 4, 2009, the entirety of which is incorporated herein by reference.

BACKGROUND

Generally described, computing devices and communication networks can be utilized to exchange information. In a common application, a computing device can request content from another computing device via the communication network. For example, a user at a personal computing device can utilize a software browser application to request content, such as a Web page, from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices. Such higher volume requests can place a strain on the content provider's computing resources utilized to provide the requested content. Additionally, the content requested by the client computing devices may have a number of components, which can further place additional strain on the content provider's computing resources.

With reference to an illustrative example, a requested Web page, or original content, may be associated with a number of additional resources, such as images or videos, which are to be displayed with the Web page. In one specific embodiment, the additional resources of the Web page are identified by a number of embedded resource identifiers, such as uniform resource locators ("URLs"). In turn, software on the client computing devices typically processes embedded resource identifiers to generate requests for the content. Often, the resource identifiers associated with the embedded resources reference a computing device associated with the content provider such that the client computing device would transmit the request for the additional resources to the referenced content provider computing device. Accordingly, in order to satisfy a content request, the content provider(s) (or any service provider on behalf of the content provider(s)) would provide client computing devices data associated with the Web page and/or the data associated with the embedded resources.

Some content providers attempt to facilitate the delivery of requested content, such as Web pages and/or resources identified in Web pages, through the utilization of a network storage provider or a content delivery network ("CDN") service provider. A network storage provider and a CDN server provider each typically maintain a number of computing devices in a communication network that can maintain content from various content providers. In turn, content providers can instruct, or otherwise suggest to, client computing devices to request some, or all, of the content provider's content from the network storage provider's or CDN service provider's computing devices.

As with content providers, network storage providers and CDN service providers are also generally motivated to provide requested content to client computing devices often with consideration of efficient transmission of the requested content to the client computing device and/or consideration of a cost associated with the transmission of the content. Accordingly, the service providers often consider factors such as latency of delivery of requested content in order to meet service level agreements or to generally improve the quality of delivery service.

With reference to the previous illustrative example, in some implementations, the content provider may desire to designate at least some of the additional resource embedded in the requested Web page as restricted content or to otherwise keep some portion of the content secure. In one approach, the content provider can utilize functionality included in the communication protocols, such as the Referer header associated with hypertext transfer protocol ("HTTP"), to restrict which clients can request content from a CDN service provider. However, such approaches are typically considered as a weak form of authentication and are prone to be spoofed. In another approach, the content provider can specify for the utilization of shared secret keys between the content provider and the CDN service provider or otherwise require the CDN service provider to authenticate all client requests for content with the content provider. However, such approaches typically require additional infrastructure and resources from the content provider and CDN service provider regarding authorization or verification protocols for each secure content request by a client.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present disclosure is directed to delivery of one or more resources associated with a content provider by selecting from available storage service providers and content delivery network ("CDN") service providers. Specifically, aspects of the disclosure will be described with regard to the management of secure resource delivery by a service provider on behalf of a content provider. In one aspect, a content provider may associate different identities to the CDN service providers utilized to distribute requested resources on behalf of the content provider. The content provider, directly or indirectly, can associate content distribution policies in accordance with each CDN service provider identity. In another aspect, the client computing devices and CDN service providers can utilize secure content signatures in content requests without requiring validation of each signed content request by the content provider. Although various aspects of the disclosure will be described with regard to illustrative examples and embodiments, one skilled in the art will appreciate that the disclosed embodiments and examples should not be construed as limiting.

Figure 1:
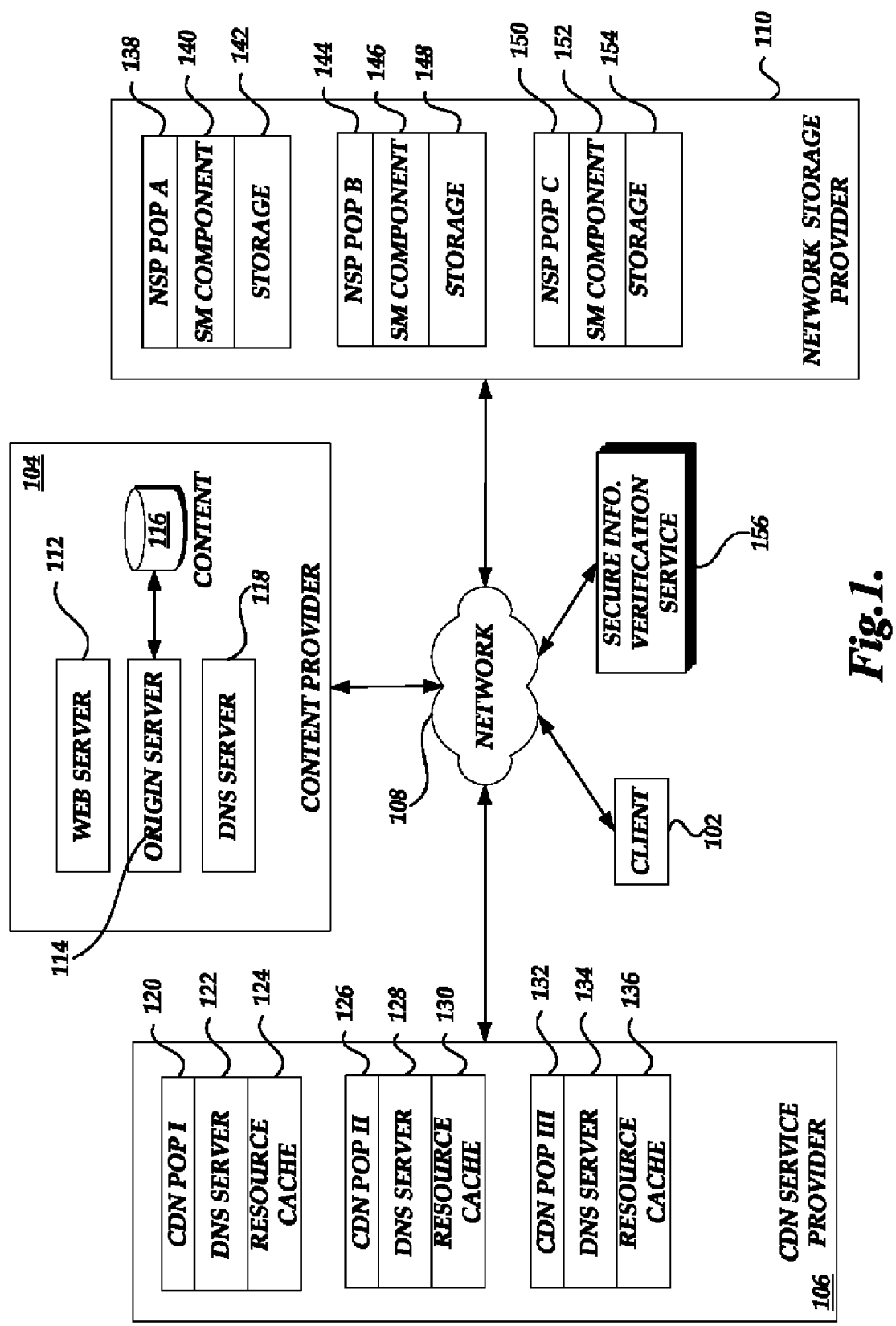
FIG. 1 is a block diagram illustrative of content delivery environment including a number of client computing devices, content provider, a network storage provider, and a content delivery network service provider.

FIG. 1 is a block diagram illustrative of content delivery environment 100 for the managing registration of content with a CDN service provider and subsequent processing of content requests. As illustrated in FIG. 1, the content delivery environment 100 includes a number of client computing devices 102 (generally referred to as clients) for requesting content from a content provider, a network storage provider 110, and/or a CDN service provider 106. In an illustrative embodiment, the client computing devices 102 can correspond to a wide variety of computing devices including personal computing devices, laptop computing devices, handheld computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources, DNS nameservers, and the like. For example, as further illustrated in FIG. 1, the content provider 104 can be associated with one or more DNS nameserver components 118 that would receive DNS queries associated with the domain of the content provider 104 and be authoritative to resolve client computing device DNS queries corresponding to a domain of the content provider 104 (e.g., return an IP address responsive to the DNS query). A DNS nameserver component is considered to be authoritative to a DNS query if the DNS nameserver can completely resolve the query by providing a responsive IP address. Additionally, the content provider 104 may include multiple components or eliminate some components altogether, such as origin server 114.

With continued reference to FIG. 1, the content delivery environment 100 can further include a CDN service provider 106 in communication with the one or more client computing devices 102, the content provider 104, and the network storage provider 110 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 120, 126, 132 that correspond to nodes on the communication network 108. Each POP 120, 126, 132 includes a DNS component 122, 128, 134 made up of a number of DNS nameserver computing devices for resolving DNS queries from the client computers 102. Each POP 120, 126, 132 also includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the CDN service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 144, 150 that correspond to nodes on the communication network 108. Each NSP POP 138, 144, 150 can include a storage management ("SM") component 140, 146, 152 for obtaining requests for resources from the client computing devices 102 and determining whether the requested resource should be provided by a CDN service provider 106 or from a storage component associated with the network storage provider 110. In an illustrative embodiment, the storage management components 138, 144, 150 can be associated with one or more DNS nameserver components that are operative to receive DNS queries related to registered domain names associated with the network storage provider 110. The one or more DNS nameservers can be authoritative to resolve client computing device DNS queries corresponding to the registered domain names of the network storage provider 110. As similarly set forth above, a DNS nameserver component is considered to be authoritative to a DNS query if the DNS nameserver can resolve the query by providing a responsive IP address.

Each NSP POP 138, 144, 150 also includes a storage component 142, 148, 154 made up of a number of storage devices for storing resources from content providers which will be processed by the network storage provider 110 and transmitted to various client computers. The storage components 142, 148, 154 may further include additional software and/or hardware components that facilitate communications including, but not limited to, load balancing or load sharing software/hardware components. In an illustrative embodiment, the storage components 142, 148, 154 are considered to be logically grouped, regardless of whether the components, or portions of the components, are physically separate.

Additionally, although the NSP POPs 138, 144, 150 are illustrated in FIG. 1 as logically associated with the network storage provider 110, the NSP POPs will be geographically distributed throughout the communication network 108 in a manner to best serve various demographics of client computing devices 102. Additionally, the network storage provider 110 can be associated with various additional computing resources, such additional computing devices for administration of content and resources, additional DNS nameservers, and the like. Even further, the components of the network storage provider 110 and components of the CDN service provider 106 can be managed by the same or different entities.

In an illustrative embodiment, the content delivery environment 100 can further include one or more secure information verification services 156. The secure information verification services 156 can be used in conjunction with a secured resource request, or secured content request, to verify security information provided by the client computing devices 102 or the CDN service provider 106. The secure information verification services 156 can be associated with one or more components of the content delivery environment 100. Alternatively, the secure information verification services 156 can be an independent, third party service utilized by other components in the content delivery environment 100.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

With reference now to FIGS. 2-6, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
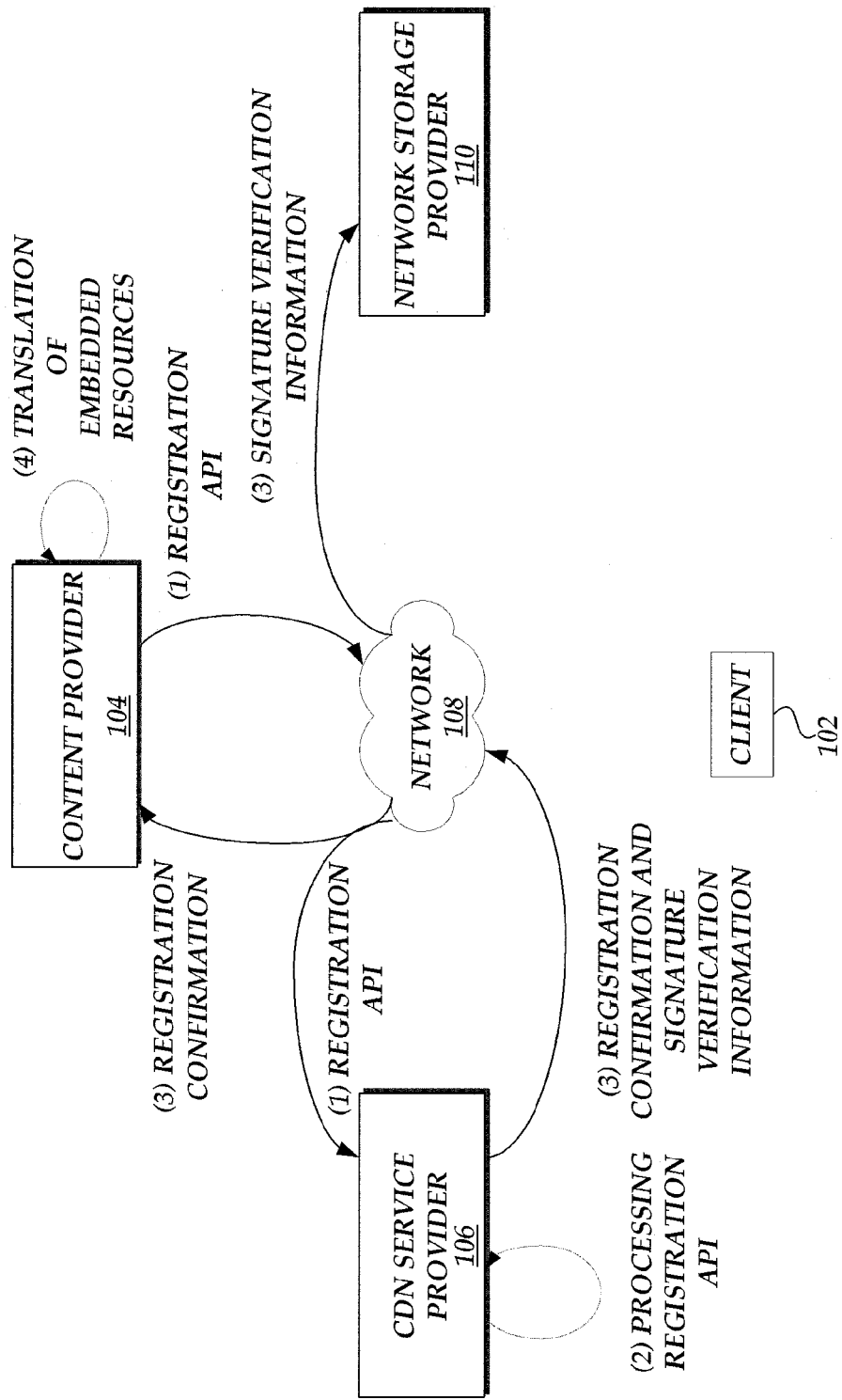
FIGS. 2A and 2B are block diagrams of the content delivery environment of FIG. 1 illustrating the registration of a content provider with a network storage provider and CDN service provider for facilitating the delivery of secure content.

With reference to FIG. 2A, an illustrative interaction for registration of a content provider 104 with the CDN service provider 106 will be described. As illustrated in FIG. 2A, the CDN service provider content registration process begins with registration of the content provider 104 with the CDN service provider 106. In an illustrative embodiment, the content provider 104 utilizes a registration application program interface ("API") to register with the CDN service provider 106 such that the CDN service provider 106 can managed content requests on behalf of the content provider 104. The registration API includes the identification of the origin server 114 of the content provider 104 that will provide requested resources to the CDN service provider 106 (either directly or via the network storage provider 110). In addition or alternatively, the registration API includes the content to be stored/managed by the CDN service provider 106 on behalf of the content provider 104.

Additionally, the registration API establishes the secured content information to be utilized by the CDN service provider 106 to manage requests by client computing devices 102. In one aspect, the secured content information can include signature information to be utilized by the CDN service provider 106 to verify secure content requests by clients. Alternatively, the secured content information can include information identifying one or more secure information verification services 156 utilized to verify secure content requests. In another aspect, the secured content information can include identity information utilized, such as an identifier, by the CDN service provider 106 to request information from an origin source, such as network storage provider 110. The identity information established for the CDN service provider 106 can be unique to individual CDN service providers or shared by two or more CDN server providers.

Based on the processing of the registration API, the CDN service provider 106 can also confirm the registration API with the content provider 104. Additionally, the CDN service provider 106 can establish secure content information with network storage provider 110, which can include signature information to be utilized by the network storage provider 110 to verify secure content requests by the CDN service provider 106. The secure content information established between the CDN service provider 106 and the network storage provider 110 can be complimentary to any secure information provided by the content provider 104 or can replace any secure information provided by the content provider. Moreover, the secure content information established between the CDN service provider 106 and the network storage provider 110 can be different from any secure information associated with client computing devices 102.

Figure 2B:
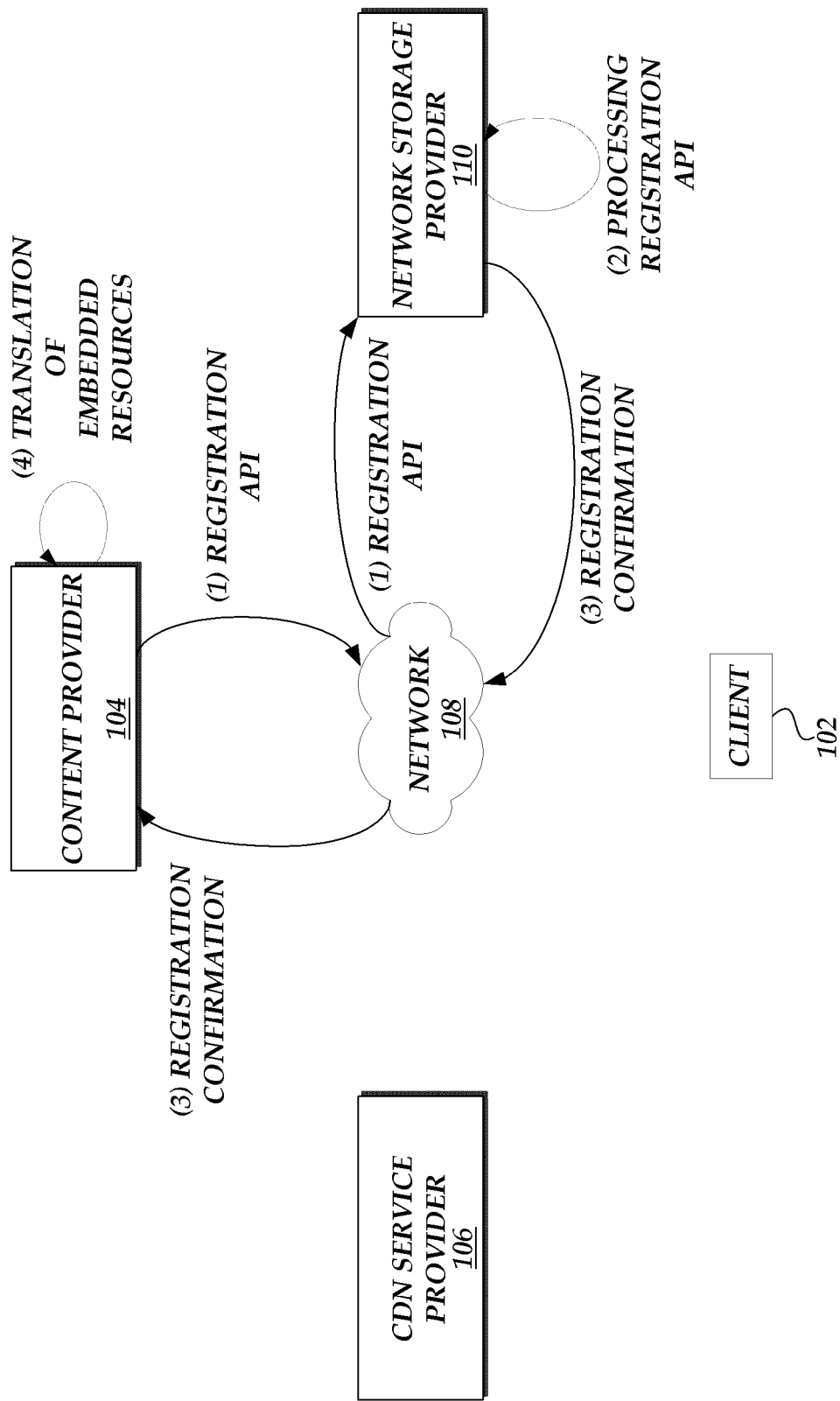
Figure 3:
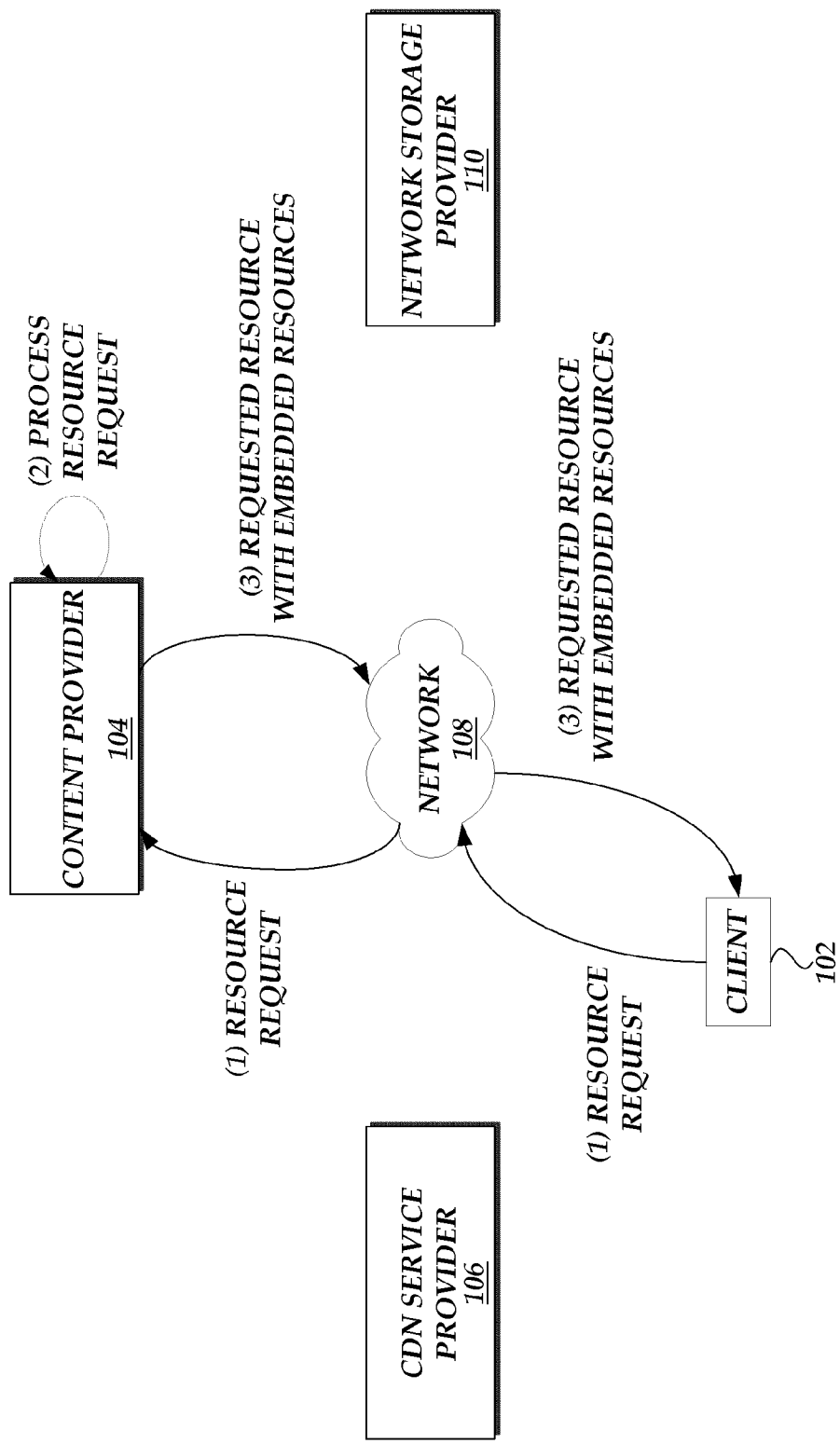
FIG. 3 is a block diagram of the content delivery environment of FIG. 1 illustrating the generation and processing of a resource request by a client computing device to a content provider.

With reference to FIG. 2B, an illustrative interaction for registration of a content provider 104 with the network storage provider 110 will be described. As illustrated in FIG. 2B, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API includes the identification of the origin server 114 of the content provider 104 that will provide requested resources to the network storage provider 110. In addition or alternatively, the registration API includes the content to be stored by the network storage provider 110 on behalf of the content provider 104. Additionally, the registration API with the network storage provider 110 can include the establishment of policies by the content provider 104 as to content requests by different identifiers associated with one or more CDN service providers 106. Still further, the content provider 104 can designate proxy authority to make, modify, or maintain policy information. The proxy authority can be provided to the CDN service providers 106 that maintain the policy information or to additional components of the content delivery environment 100.

One skilled in the relevant art will appreciate that upon storage of the content by the network storage provider 110, the content provider 104 can begin to direct requests for content from client computing devices 102 to the CDN service providers 106 or the CDN service providers to the network storage provider 110. Specifically, in accordance with DNS routing principles, a client computing device DNS request corresponding to a resource identifier would eventually be directed toward a storage component 140, 144, 148 of a NSP POP 138, 142, 146 associated with the network storage provider 110 (e.g., resolved to an IP address corresponding to a storage component).

In an illustrative embodiment, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

The network storage provider 110 returns an identification of applicable domains for the network storage provider (unless it has been previously provided) and any additional information to the content provider 104. In turn, the content provider 104 can then process the stored content with content provider specific information. In one example, the content provider 104 translates resource identifiers originally directed toward a domain of the origin server 114 to a domain corresponding to the network storage provider 110. The modified URLs are embedded into requested content in a manner such that DNS queries for the modified URLs are received by a DNS nameserver corresponding to the network storage provider 110 and not a DNS nameserver corresponding to the content provider 104.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provider, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:
  http://www.contentprovider.com/path/resource.xxx During an illustrative translation process, the content provider URL is modified such that requests for the resources associated with the modified URLs resolve to a POP associated with the CDN service provider 106. In one embodiment, the modified URL identifies the domain of the CDN service provider (e.g., "CDNprovider.com"), the same name of the resource to be requested (e.g., "resource.xxx") and the same path where the resource will be found (e.g., "path"). Additionally, the modified URL can include additional processing information (e.g., "additional information"). Still further, in the event the requested resource is designated as secured content by the content provider 104, the content provider URL will include some type of signature information that will be utilized by the CDN service provider 106 to verify that the request for the resource has been authorized by the content provider 104 (e.g., "signature information"). The modified URL would have the form of:
  http://additional information.CDNprovider.com/path/resource.xxx?signature_information In another embodiment, the information associated with the CDN service provider 106 is included in the modified URL, such as through prepending or other techniques, such that the modified URL can maintain all of the information associated with the original URL. In this embodiment, the modified URL would have the form of:
  http://additional information.CDNprovider.com/www.contentprovider.com/path/resource.xxx?signature_information With reference now to FIG. 3, after completion of the registration and translation processes illustrated in FIG. 2, a client computing device 102 subsequently generates a content request that is received and processed by the content provider 104, such as through the Web server 112. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. In one embodiment, the embedded resource identifiers will generally in the form of the modified URLs, described above. Alternatively, one or more embedded resources may not correspond to secure content. Accordingly, the modified URLs associated with such non-secure content may not include the additional signature information.

Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the CDN service provider 106. Upon receipt of the returned CNAME, the client computing device 102 subsequently transmits a DNS query corresponding to the received CNAME. The client computing device 102 can then process the response to the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

Figure 4A:
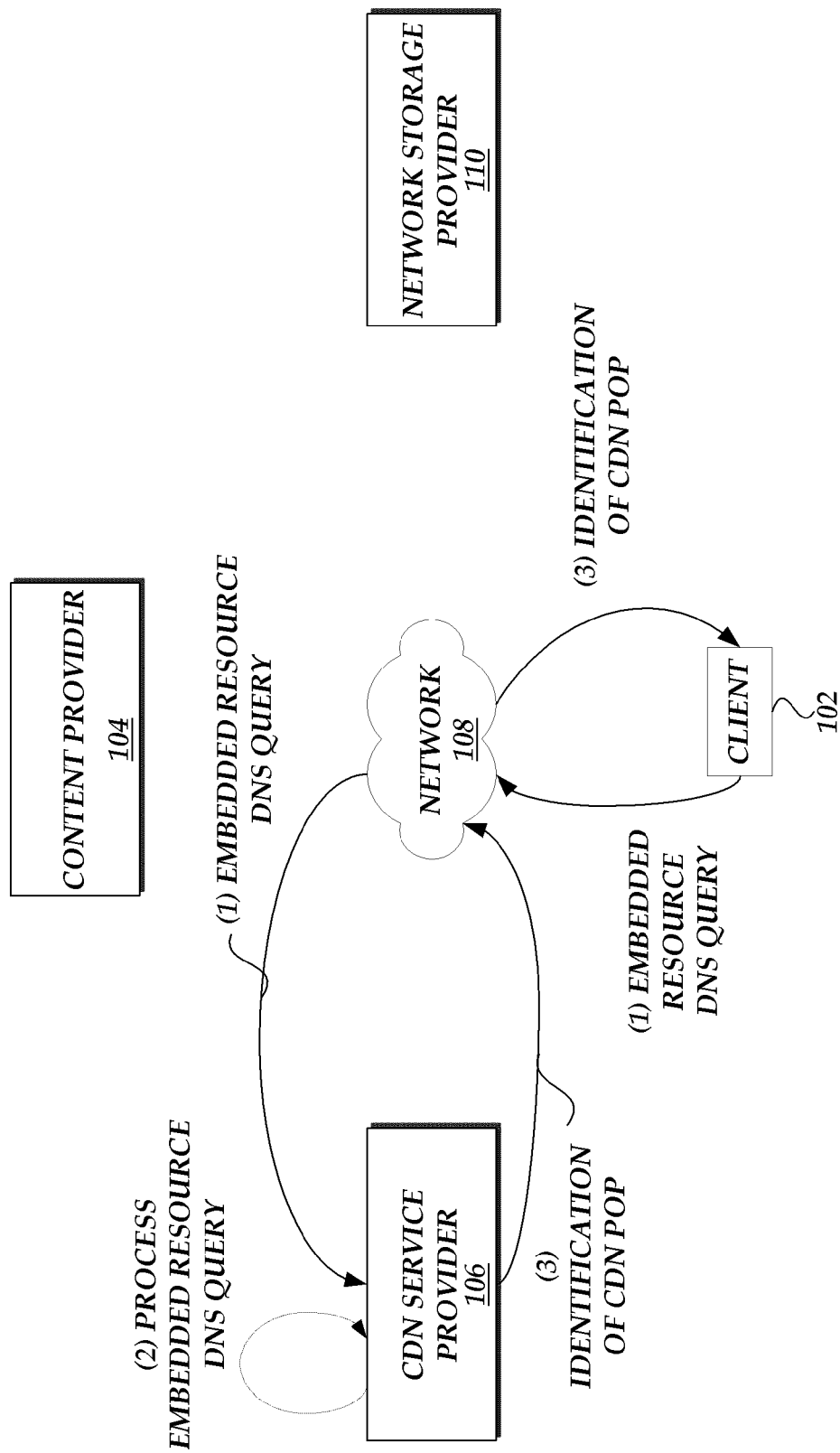
FIGS. 4A-4C are block diagrams of the content delivery environment of FIG. 1 illustrating obtaining client computing device DNS queries and having the subsequent resource request processed by a CDN service provider.

With reference now to FIG. 4A, upon receipt of the requested content, the client computing device 102, such as through a browser software application, begins processing any of the markup code included in the content and attempts to acquire the resources identified by the embedded resource identifiers (e.g., the embedded, modified URLs). Accordingly, the first step in acquiring the content corresponds to the issuance, by the client computing device 102 (through its local DNS resolver), of a DNS query for the embedded, modified URL that results in the identification of a DNS nameserver authoritative to the "." and the "com" portions of the embedded, modified URL. After partially resolving the modified URL according to the "." and "com" portions of the embedded URL, the client computing device 102 then issues another DNS query for the embedded, modified URL that results in ".CDNprovider" portion of the embedded, modified URL. The issuance of DNS queries corresponding to the "." and the "com" portions of a URL, such as the embedded, modified URL, are well known and have not been illustrated.

In an illustrative embodiment, the identification of a DNS nameserver authoritative to the "CDNprovider" corresponds to an IP address of a DNS nameserver associated with the CDN service provider 106. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such that a specific POP will receive the request as a function of network topology. For example, in an anycast implementation, a DNS query issued by a client computing device 102 to a shared IP address will arrive at a DNS nameserver component of the CDN service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a CDN service provider POP. With continued reference to FIG. 4A, once one of the DNS nameservers in the CDN service provider 106 receives the request, the specific DNS nameserver attempts to resolve the request.

Figure 4B:
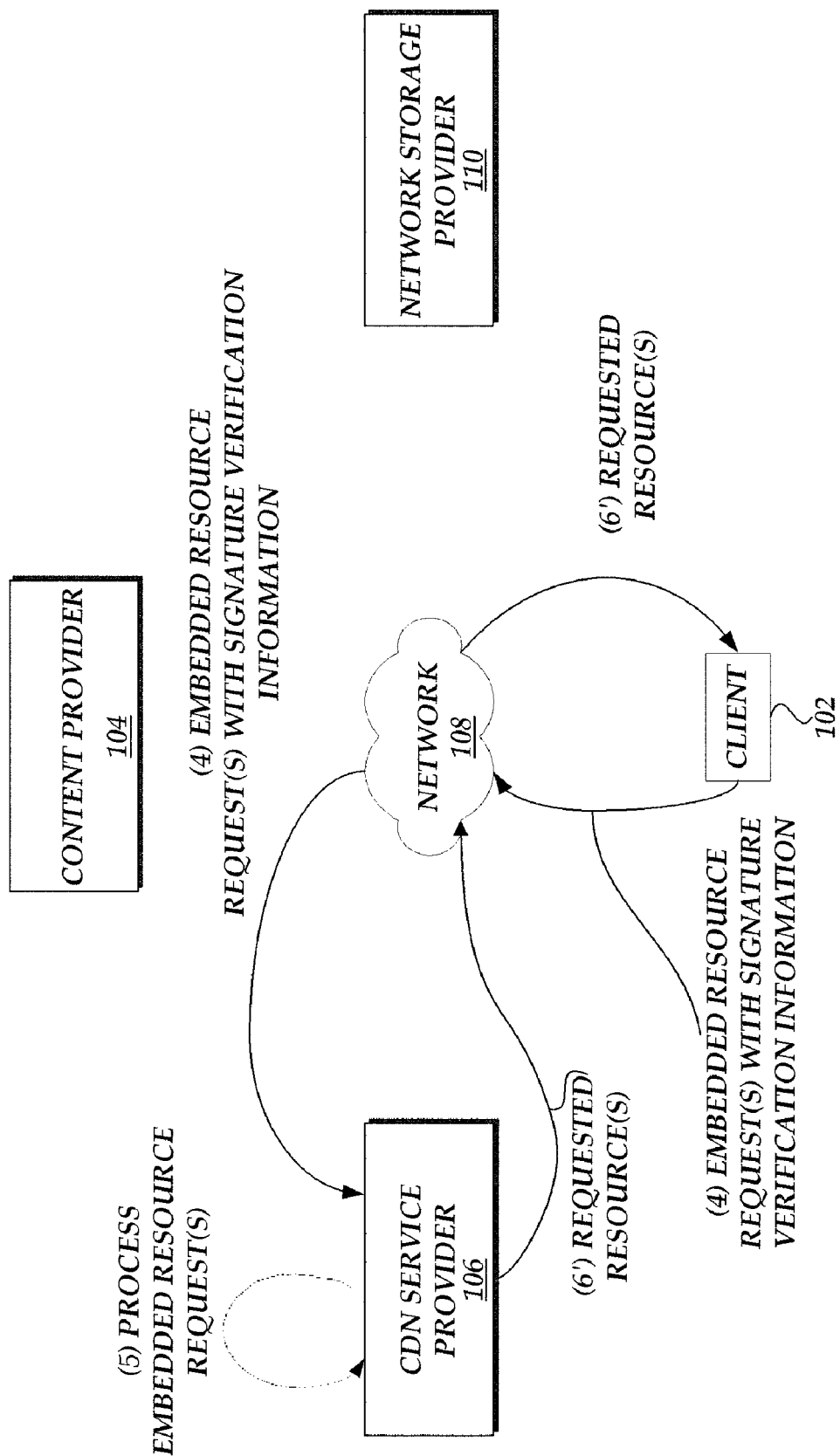

With reference now to FIG. 4B, upon receipt of the successful resolution of the DNS query to the CDN service provider storage component (e.g., a DNS query corresponding to the modified URL http://additional information.CDNprovider.com/path/resource.xxx), the client computing device 102 transmits embedded resource requests to the CDN service provider storage component 124, 130, 136 (FIG. 1) corresponding to the previously provided IP address, illustrated generally as being received by the CDN service provider 106.

Upon receipt, the receiving CDN service provider storage component can process the resource request from the client computing device 102. In a first aspect, if the requested content corresponds to secure content (as designated by the content provider 104), the CDN service provider storage component can first verify whether the embedded resource request from the client computing device 102 includes appropriate signature information. As discussed with regard to FIG. 2A, the content provider 104 can provide the CDN service provider 106 with the necessary signature information for processing client computing device resource requests. Alternatively, the content provider 104 and CDN service provider 106 can be configured to utilized one or more additional network based services, such as secure information verification services 156, to verify signature information included in any embedded resource requests. If the embedded resource request does not include the necessary signature information or if submitted signature information is not valid or expired, the CDN service provider 106 can return an error message or otherwise reject the resource request from the client computing device.

Alternatively, as illustrated in FIG. 4B, if the CDN service provider 106 determines that the submitted signature information is valid and appropriate, the CDN service provider attempts to process the resource requests from resources maintained by the CDN service provider 106 (at one or more POPs 120, 126, 132 (FIG. 1)). If the requested resource is available, the CDN service provider 106 provides the requested resource to the client computing device 102. For example, the requested resource can be transmitted to the requesting client computing device 102 via the communication network 108.

Figure 4C:
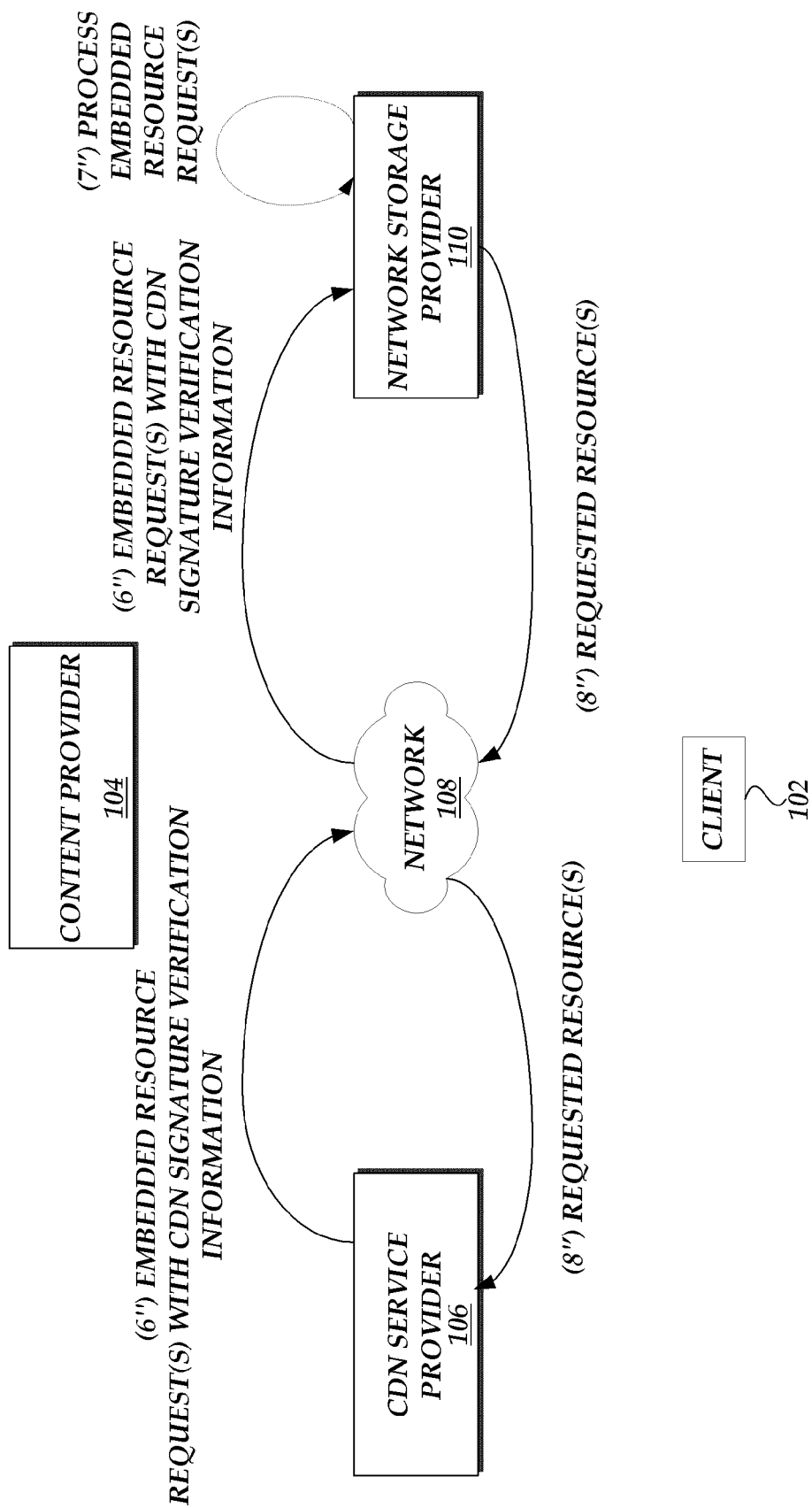

With reference now to FIG. 4C, in an alternative embodiment, assume that the CDN service provider 106 determines that the submitted signature information is valid and appropriate, but the requested resource is not available at the CDN service provider POPs. For example, the client computing device request for the resource may be the first request for such a resource. In another example, the version of the resource maintained by the CDN service provider 106 may no longer be valid (e.g., based on expiration data associated with, or otherwise maintained, by the CDN service provider). Because the requested resource is not available, the CDN service provider 106 requests the resource from a designated origin source, such as the network storage provider 110. In an illustrative embodiment, the CDN service provider's resource request includes an identity provided by the content provider 104. Additionally, in an illustrative embodiment, the CDN service provider's resource request includes signature information utilized by the network storage provider 110. Illustratively, the signature information can be different from the signature information provided by the client computing device 102 (FIG. 4B). If the signature information is not valid or incomplete, the network storage service provider 110 can reject the resource request.

Based on the submitted identifier and signature information, the network storage service provider 110 processes the resource requests in accordance with the policies previously set by the content provider 104. For example, the network storage service provider 110 may maintain access control lists ("ACL") based on identities. The ACLs can define which identities can access a requested resource, criteria associated with authorized access (e.g., time restraints for accessing resources) and various policies that are to be associated with returned resources (e.g., expiration data for the requested resource). One skilled in the relevant art will appreciate that additional or alternative policy information may be utilized by the content provider 104 or network storage provider 110. Still further, in an illustrative embodiment, the content provider 104 may authorize, or otherwise designate as proxies, entities to define, modify or maintain policy information. For example, a network storage provider 110 may be authorized by a content provider 104 to modify any policy information associated with one or more CDN service providers 106.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing content requests comprising:
    a content delivery network (CDN) component corresponding to a CDN service provider, the CDN component including a computing device, the computing device including a processor and a memory, the CDN component operative to:
        host or process content on behalf of an original content provider, wherein the original content provider is different from the CDN service provider;
        receive a security-based client request for an embedded resource from a client, wherein the security-based client request is associated with an embedded resource identifier including first signature information and originally provided to the client from the original content provider; and
        provide the embedded resource to the client based on processing the security-based client request to verify the first signature information; and
    an origin source component corresponding to a network storage service provider, the origin source component including a computing device including a processor and a memory, the origin source component operative to:
        function as a content origin source on behalf of the original content provider, wherein the network storage service provider is different from the CDN service provider and the original content provider;
        receive a security-based CDN service provider request for an embedded resource from the CDN component, wherein the security-based CDN service provider request includes an identifier corresponding to the CDN service provider and second signature information that is different from the first signature information; and
        responsive to the security-based CDN service provider request from the CDN component processing the security-based client request, provide the embedded resource to the CDN service provider based on verification of the second signature information and in accordance with policies associated with the identifier corresponding to the CDN service provider.

2. The system as recited in claim 1, wherein the identifier is originally provided by the original content provider.

3. The system as recited in claim 1, wherein the policies associated with the identifier correspond to an access control list associated with the identifier.

4. The system as recited in claim 3, wherein the access control list is configured by the original content provider.

5. The system as recited in claim 3, wherein the access control list identifies one or more entities that may access the requested embedded resource.

6. The system as recited in claim 5, wherein the access control list defines one or more parameters associated with access to the embedded resource by the one or more identified entities.

7. The system as recited in claim 3, wherein the access control list defines one or more parameters associated with the requested embedded resource.

8. The system as recited in claim 1, wherein information associated with the security-based CDN service provider request is originally provided by the network storage service provider.

9. The system as recited in claim 1, wherein the CDN component processes the security-based client request using a secure information verification service to verify the first signature information.

10. A computer-implemented method for managing content requests comprising:
    hosting or processing content, by a content delivery network (CDN) computing device corresponding to a CDN service provider, on behalf of an original content provider, wherein the original content provider is different from the CDN service provider and wherein the CDN computing device includes a processor and a memory;
    receiving, by the CDN computing device, a security-based client request for an embedded resource from a client, wherein the security-based client request is associated with an embedded resource identifier including first signature information and originally provided to the client from the original content provider;
    providing, by the CDN computing device, the embedded resource to the client based on processing the security-based client request to verify the first signature information;
    receiving, by a network storage computing device, a security-based CDN service provider request for an embedded resource from the CDN computing device, wherein the network storage computing device corresponds to a network storage service provider functioning as a content origin source on behalf of the original content provider, wherein the network storage service provider is different from the CDN service provider and the original content provider, and wherein the security-based CDN service provider request includes an identifier corresponding to the CDN service provider and second signature information that is different from the first signature information; and responsive to the security-based CDN service provider request from the CDN computing device processing the security-based client request, providing the embedded resource to the CDN service provider based on verification of the second signature information and in accordance with policies associated with the identifier corresponding to the CDN service provider.

11. The computer-implemented method as recited in claim 10, wherein the identifier is originally provided by the original content provider.

12. The computer-implemented method as recited in claim 10, wherein the policies associated with the identifier correspond to an access control list associated with the identifier.

13. The computer-implemented method as recited in claim 12, wherein the access control list is configured by the original content provider.

14. The computer-implemented method as recited in claim 12, wherein the access control list identifies one or more entities that may access the requested embedded resource.

15. The computer-implemented method as recited in claim 14, wherein the access control list defines one or more parameters associated with access to the embedded resource by the one or more identified entities.

16. The computer-implemented method as recited in claim 12, wherein the access control list defines one or more parameters associated with the requested embedded resource.

17. The computer-implemented method as recited in claim 10, wherein information associated with the security-based CDN service provider request is originally provided by the network storage service provider.

18. The computer-implemented method as recited in claim 10, wherein the CDN computing device processes the security-based client request using a secure information verification service to verify the first signature information.

* * * * *